United States Patent [19]
Reilly

[11] 3,993,353
[45] Nov. 23, 1976

[54] FARM WAGON VEHICLE
[76] Inventor: James H. Reilly, 7345 Wilcox, Brown City, Mich. 48416
[22] Filed: May 30, 1975
[21] Appl. No.: 582,897

Related U.S. Application Data
[63] Continuation of Ser. No. 439,338, Feb. 4, 1974, abandoned.

[52] U.S. Cl. .............................. 298/22 R; 298/23 F; 214/501; 292/50
[51] Int. Cl.² .......................................... B60P 1/04
[58] Field of Search ................. 298/38, 23 D, 23 R, 298/23 DF, 23 A, 23 F, 17 R; 292/50; 214/501; 296/56

[56] References Cited
UNITED STATES PATENTS
| | | | |
|---|---|---|---|
| 682,834 | 9/1901 | Shadbolt | 298/38 X |
| 1,210,867 | 1/1917 | Starner | 298/38 X |
| 1,735,065 | 11/1929 | Walsh et al. | 298/38 |

FOREIGN PATENTS OR APPLICATIONS
1,243,664  8/1971  United Kingdom .................. 296/56

Primary Examiner—Frank E. Werner
Attorney, Agent, or Firm—Dale Austin Winnie

[57] ABSTRACT

An all purpose wagon vehicle for general farm use, including an undercarriage frame on which is provided a dump box having a floor and fixed front and side walls standing thereover, with the dump box being tiltable on the undercarriage frame to discharge whatever it carries rearwardly, and a rear wall closure door which is hinged to the side walls forwardly of the normal upper back edge corners to open only upon the appreciable tilting of the dump box and without ground interference. And, a special latching mechanism operative in the course of tilting the dump box on the frame, to automatically allow the closure door to open or be held closed.

6 Claims, 4 Drawing Figures

FARM WAGON VEHICLE

This is a continuation of application Ser. No. 439,338, filed Feb. 4, 1974, now abandoned.

BACKGROUND

Farmers have been making considerable use of simple wagons, for many years, to harvest crops, collect and haul hay, grain, silage, etc. However, the commonly known simple wagon, as such, requires that whatever has to be loaded or unloaded be pitched into the wagons, and out again, which requires a considerable amount of work and time.

To alleviate this problem, special farm vehicles have been manufactured and made available, to serve the purpose of the old farm wagons, with their own drive power source and specially devised means for helping to simplify the loading and unloading work required. But, such farm vehicles and equipment are expensive in both investment costs and maintenance to the average farmer; particularly when they have limited uses around the farm and are required to set idle and unused a good part of the year. Although farm equipment manufacturers have tried to provide as much dual or multiple purpose use as possible into their various pieces of equipment, they do not have the servicability that the old farm wagon had nor its simplicity of construction which enabled the farmer to make most of his own repairs.

Gone also is the ability to have several farm wagons that could be pulled in tandem or longer trains and whereby an independent tractor could pull and maneuver the wagons through the fields for their intended purpose; allowing one or more tractors to serve any number of wagons and the wagons to be left in the field without typing up the expensive tractor part of the presently known and used self-propelled equipment.

What is really needed by the farmer is a more simple farm vehicle, like the old wagon, which is not too expensive and accordingly can be had in greater number, taken into the fields and left, or moved from one location to another, for whatever purpose without as much concern. In addition, some means is needed to simplify the unloading, in particular, of such a wagon type vehicle; and the more simple and inexpensive it is the better.

The versatility of use, and ability to use one or more wagons, as particular situations may require, have once more become of prime importance in efficient farm management.

SUMMARY

The present invention relates to a relatively simple farm vehicle, suitable for many uses, and which is best described as a dump wagon.

In construction and general appearance it is similar to the well known flat-bed farm wagon with staked end and side walls; except that the front end is cut down and more open, and the side walls stand higher. Actually, it is more of an upwardly open box, with a hinged tail gate or back wall closure and it is mounted on an axle frame so that it can be raised up and tilted rearwardly to discharge whatever it carries through and under the specially mounted tail gate or back wall closure member.

Of particular importance is the hinge construction for the back wall closure on the dump box and the latching mechanism that is used with it.

This includes having hinge supporting arms, which may be metal plate secured to the side edges of the back wall closure door at their upper corners, that extend forwardly into the dump box and are fixed to the side walls by pivotal means so that the hinge axis for the closure door is spaced relatively forward from the normal position and allows the closure door to open only after the dump box has assumed an appreciably tilted position. Additionally, the forward hinging of the closure door precludes any ground interference by the door which would otherwise occur if it were hinged at the extreme upper end corners of the dump box.

The latching means is most simple and unique in including merely a latching member pivotally mounted on the box floor, below the free end of the closure door, and having its free end, which does the latching, connected by a flexible cable to an anchoring point on the axle frame so that the cable is drawn tight and the latching member is held in place when the dump wagon is untilted — and the cable becomes slack, letting the latching member fall free, when the dump box is tilted.

Further details are given in the description of the illustrated embodiment of the invention which follows hereinafter.

DESCRIPTION OF THE DRAWING FIGURES

DETAILED DESCRIPTION OF ILLUSTRATED EMBODIMENT

Figure 1:
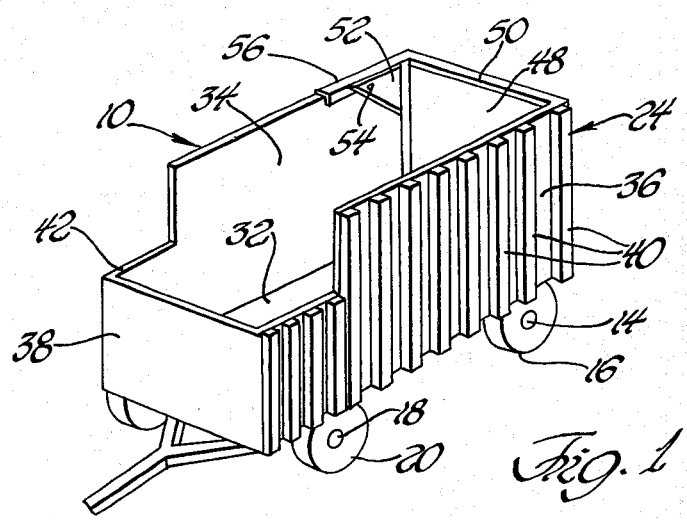
FIG. 1 is a perspective view of the proposed all purpose farm vehicle, or dump box wagon, of the present invention.

The farm vehicle of this invention is best described, as previously mentioned, as a dump wagon and has the general appearance of that shown in the first drawing figure and identified by the numeral 10.

It includes an undercarriage frame 12 which has a fixed rearwardly disposed wheel supporting axle 14, on which are provided the wheels 16, and it has a forwardly disposed wheel supporting axle 18, which carry the wheels 20, that is pivotally mounted to the frame and includes a wagon tongue 22 for steering purposes and pulling the farm vehicle from one location to another.

On the frame is mounted the dump box 24 which includes an underframe of its own that is provided by a pair of longitudinal beams 26 with cross members 28 at regularly spaced intervals and a subfloor 30. A cover floor 32 is provided over the subfloor and side walls 34 and 36 as well as a front wall 38 are fixed in place to provide an upwardly open box-like enclosure.

The side walls 34 and 36 may be structurally reinforced by vertical number 40, generally aligned with the underframe cross members 28, if needed or desired, and the front wall 38 may be of a lesser height, and the side walls next thereto cut down to the same height, as at 42, for easier front loading access as another convenience, if wanted.

Figure 2:
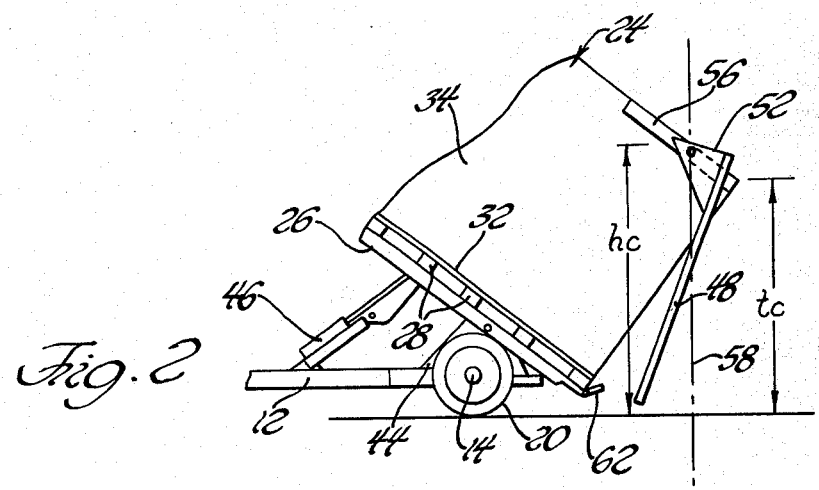
FIG. 2 is a side plan view of the vehicle, with one side wall removed, showing the dump box as tilted and the back wall closure wall or door as hinged open.
Figure 3:
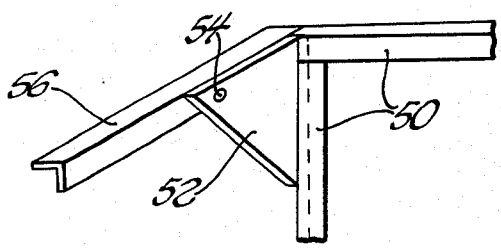
FIG. 3 is a perspective view of the hinge construction for the back wall closure door.
Figure 4:
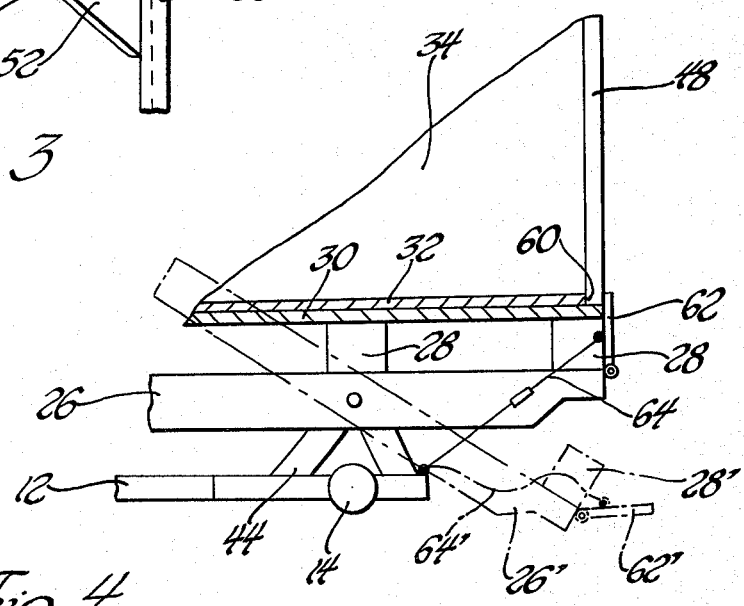
FIG. 4 is an enlarged fragmentary detail showing the back end of the dump box on the undercarriage frame in full line, as disposed in a load carrying position, and the floor section thereof in dotted outline, as tilted, to better illustrate the latching mechanism proposed.

The dump box 24 is pivotally mounted on the undercarriage frame 12 on a suitable support 44, generally over the rear axle 14, as is shown in FIGS. 2 and 4, and it will be appreciated that the front end of the dump box is carried on a like support at the front end of the undercarriage (although not specifically shown) so that it is level in its load carrying disposition.

Between the undercarriage frame 12 and the underframe of the dump box 24 is provided hydraulic or other power operated means 46 for causing the dump box to be tilted downwardly rearwardly, by raising its front end, as is generally shown in the second drawing figure.

Of principal importance, and yet to be described, is the back wall closure 48 for the dump box.

Referring to FIG. 2, and also to FIG. 1, it will be seen that the back wall closure 48 for the dump box 24 is a full wall closure which is hinged to the two side wlals 34 and 36 near their upper rearwardly disposed corners. However, it is not hinged at their rear most corners but forwardly thereof and, as a consequence, does not have the normal flap opening action otherwise expectable.

The rear wall closure 48 serves as a hinged closure door and is so mounted that its opening action is both delayed, in the course of the tilted actuation of the dump box, and is also minimized and precluded from having ground interference when opened.

The closure wall door is framed with angle iron, as at 50, along its top, bottom and side edges, for added structural strength and to maintain its squareness, and it has a pair of pivotal arms, provided by right angle plates 52, welded to each of its side edges near its upper edge, and which extend forwardly and are hung on a hinge pin 54 that is itself provided through the side walls and a reinforcing angle iron edge 56 provided on each of the side walls from their back edge forwardly.

The latter arrangement, of the door framing angle iron 50, pivot arms or hinge plates 52, and side wall edge reinforcing member 56, is shown in and by itself in the third drawing figure.

As a consequence of this particular way that the rear wall closure door 48 is hung on the dump box 24, the free hanging weight of the closure door will cause it to lie open essentially as shown in the third drawing figure, in the near full open tilted disposition of the box.

The reference line 58 is through the hinge connection and the height lines identified "hc" and "tc" respectively identified the hinge connection height and top corner height of the box in such a tilted disposition.

From the foregoing it will be appreciated that in having the hinge connection for the rear closure door shifted forwardly, its free hanging weight will not cause it to open until the hinge point passes the lower corner edge of the dump box, in tilting it for unloading dump action. Also, that the hinge connection point is at a relatively higher level than the top corner edge of the side walls, when the box is tilted, so that the opening arc of the lower edge of the closure door may be assured of ground clearance and pulled fully open, if desired, without any ground obstruction.

It also follows that when the dump box is being re-set to a horizontal load carrying position, the closure wall door 48 will attain an earlier closed position, then would otherwise be the case.

In the particular embodiment shown the rear edge of the cover floor 32 serves as a stop for the closure door, as indicated by the reference line and numeral 60, in the fourth drawing figure.

Another feature of note is the latching mechanism used to keep the rear wall closure door 48 closed, for loading purposes, and to allow it to freely swing open in the dumping or unloading situation.

This is accomplished by having one or more latching members 62 pivotally mounted on the back end of the dump box underframe, generally the rearmost cross member, with its free end disposed to overlap the bottom edge of the back wall closure door in its closed position; as shown in FIG. 4, And, in having a flexible cable 64 connected between the free end of the latching member and the undercarriage frame as shown, or a like fixed anchoring point, off from the pivotal axis about which the dump box is tiltable.

The frame member of the dump box at the back, may be bored or slotted to provide the necessary cable access, or the latch member may be otherwise mounted, as long as it is disposed to serve its latching purpose, without departing from this aspect of the invention.

The important thing is that the latching cable connection be made to an anchoring point which will cause the cable to become slack when the box is tilted, as shown in the dotted line view (wherein like parts bear the same but prime marked numbers) and the latching member be accordingly allowed to fall free.

When the dump box is set up again on the undercarriage frame the cable 64 is drawn tight and the latch member 62 is reset automatically, by use of the foreshortening cable connection, and no individual attention is required.

For the general description given it will be seen that a simple farm wagon vehicle of this type may be made of lumber or other materials (excluding the undercarriage frame part) which the farmer can easily repair and service. Consequently, the cost will not be too much and a number of such wagons can be had for a relatively minor investment.

The operation of such a farm vehicle is relatively simple, requiring only a tractor and power take-off to operate the lift, to effect the dump and return positions, and any number of such wagons may be pulled in a train or left in the field, as desired.

The wagons may be used for hauling anything anywhere and may be used to unload whatever they carry by dumping it wherever needed or spreading it wherever desired; as by tilting the box to allow the rear door to open while still pulling the wagon forward.

Any number of uses are available and foreseeable without further enumeration; the wagon being intended, as originally stated, to be of multiple use and purpose for any and all needs.

I claim:

1. A general purpose wagon vehicle, comprising; an undercarriage frame for a wagon type vehicle having a fixed rearwardly disposed wheel carrying axle and a pivotally mounted forwardly disposed wheel carrying axle including a wagon tongue for general pulling and steering purposes, a dump box provided on and hinged to said undercarriage frame relatively over said rearwardly disposed wheel carrying axle and having a floor with front and side walls provided thereover and around, means provided on said undercarriage frame and operatively engaged to said dump box for raising the front end thereof and tilting the floor of said dump box downward rearwardly, and a back wall closure hinged to respectively opposite side walls of said dump box, said back wall closure including hinge means therefore provided sufficiently forward of the back end of said dump box for significantly minimizing the hinged opening provided thereby in the fully tilted disposition of said dump box for dump spreading use and serving as the sole means of hinging actuation for said back wall closure, including a latch mechanism for said back wall closure allowing it to automatically open in the tilted disposition of said dump box and to be held closed in the untilted disposition thereof, said latch mechanism comprising a latch member pivotally affixed to the back end of said dump box relatively below said floor and for providing a stop against the opening of said back wall closure in the latching disposition thereof, and flexible cable means fastened between said latch member and said under carriage frame a foreshortened distance apart from the hinging axis for said dump box on said frame for providing slack in said cable means and unlatching of said latch member prior to the free hinged weight of said back wall closure being applied thereagainst.

2. The general purpose wagon of claim 1, including means providing a forward swinging stop for said back wall closure at the floor level thereof, and said latch member being disposed and said cable means adjustable to hold said back wall closure against said stop in the untilted disposition of said dump box and following the stop arrested closure thereof.

3. The general purpose wagon of claim 2, the back edge of the floor of said dump box being disposed to provide said forward swinging stop means for said back wall closure.

4. A latching mechanism for releasing and retaining two hingedly connected members together, where one of said members is itself tiltable about a given axis, and which is automatically responsive to the tilted disposition thereof, comprising; a latch member hingedly connected to the tiltable one of said members for engagement with and the release of the free end of the other of said members, a laterally flexible cable fastened between the free end of said latch member and a relatively fixed anchoring point a foreshortened distance apart from said given axis for causing said cable to be shortened and slackened and to release said latch member upon the tilting of said one member and said cable to be drawn tight for activating said latch member in the untilted disposition thereof, and having the hinging axis for said two hingedly connected members disposed sufficiently apart and forwardly of said latch member for precluding premature actuation inhibiting pressure thereagainst.

5. In a general purpose wagon vehicle having an undercarriage frame, a fixed rearwardly disposed wheel carrying axle and a pivotally mounted forwardly disposed wheel carrying axle, a wagon tongue for general pulling and steering purposes, a dump box provided on and hinged to said undercarriage frame relatively over said rearwardly disposed wheel carrying axle and having a floor with front and side walls provided thereover and around, means provided on said undercarriage frame and operatively engaged to said dump box for raising the front end thereof and tilting the floor of said dump box downward rearwardly, and a back wall closure hinged to respectively opposite side walls of said dump box, the improvement comprising;

said back wall closure being hinged directly to said side walls forwardly of the ends thereof and within the standing height thereof for providing substantially greater than normal ground clearance therefor in the tilted disposition of said dump box and the free hanging hinged opening of said closure wall, said closure wall being hinged directly to said side walls and within the height thereof for providing load bearing structural bracing between and within the height thereof and unobstructive clearance thereover, said closure wall being of sufficient depth and weight in proportion to anticipated wagon loads for providing free-hanging over-center load-retaining self-closure thereof in the horizontal disposition of said dump box, and said closure wall being so constructed, hinged and of such weight as to sufficiently resist and counteract the moment force of a load acting thereagainst when said dump box is being tilted to be restrictive of the opening provided for load spreading purposes.

6. The improvement of claim 5, in combination with; a general purpose wagon vehicle as recited and having ground clearance, an overhang and an angle of tilt which in combination are capable of causing a normally hung back wall closure to have ground interference.

* * * * *